(12) United States Patent
Wang et al.

(10) Patent No.: US 10,123,287 B2
(45) Date of Patent: Nov. 6, 2018

(54) DISTRIBUTED SCHEDULING MULTI-BOARD ARCHITECTURE FOR WIRELESS TRANSCEIVER STATION

(71) Applicants: Jerry Z. Wang, Marlboro, NJ (US); Venkata Vankayala, Guntur (IN); Ramdhan Singh, Bangalore (IN); Constant Conan, Perros-Guirec (FR); Emad N. Farag, Flanders, NJ (US); Taofik Saidi, Saint Michel en Greve (FR)

(72) Inventors: Jerry Z. Wang, Marlboro, NJ (US); Venkata Vankayala, Guntur (IN); Ramdhan Singh, Bangalore (IN); Constant Conan, Perros-Guirec (FR); Emad N. Farag, Flanders, NJ (US); Taofik Saidi, Saint Michel en Greve (FR)

(73) Assignees: Alcatel Lucent, Boulogne-Billancourt (FR); Nokia of America Corporation, Murray Hill, NJ (US)

(\*) Notice: Subject to any disclaimer, the term of this patent is extended or adjusted under 35 U.S.C. 154(b) by 74 days.

(21) Appl. No.: 14/270,695

(22) Filed: May 6, 2014

(65) Prior Publication Data
US 2015/0327290 A1 Nov. 12, 2015

(51) Int. Cl.
*H04W 72/12* (2009.01)
*H04W 56/00* (2009.01)
*H04W 88/08* (2009.01)
*H04L 5/00* (2006.01)

(52) U.S. Cl.
CPC ........ *H04W 56/00* (2013.01); *H04W 56/001* (2013.01); *H04W 72/1263* (2013.01); *H04W 88/08* (2013.01); *H04L 5/001* (2013.01); *H04L 5/0044* (2013.01); *H04L 5/0053* (2013.01); *H04W 72/12* (2013.01)

(58) Field of Classification Search
CPC ........... H04W 72/1263; H04W 56/001; H04W 16/02; H04W 88/08
See application file for complete search history.

(56) References Cited

U.S. PATENT DOCUMENTS

| | | | |
|---|---|---|---|
| 6,587,448 B1 | 7/2003 | Dajer et al. | |
| 2002/0123365 A1 | 9/2002 | Thorson et al. | |
| 2009/0180435 A1* | 7/2009 | Sarkar | H04L 5/14 370/330 |
| 2010/0014604 A1* | 1/2010 | Motoyoshi | H04L 1/0003 375/260 |
| 2010/0067464 A1* | 3/2010 | Higuchi | H04L 5/0007 370/329 |
| 2010/0067599 A1* | 3/2010 | Dayal | H04L 27/261 375/267 |

\* cited by examiner

*Primary Examiner* — Anez Ebrahim
(74) *Attorney, Agent, or Firm* — Harness, Dickey & Pierce, P.L.C.

(57) ABSTRACT

A transceiver station includes a first board and a second board. The first board includes an anchor cell L2 scheduler configured to schedule at least one of uplink and downlink transmissions for a multi-carrier user on only a first of the plurality of carriers. The second board includes a secondary cell L2 scheduler configured to schedule at least one of uplink and downlink transmissions for the multi-carrier user on only a second of the plurality of carriers, the second board being separate from, but interconnected with the first board.

18 Claims, 10 Drawing Sheets

DISTRIBUTED SCHEDULING MULTI-BOARD ARCHITECTURE FOR WIRELESS TRANSCEIVER STATION

BACKGROUND

Wireless technology standards, such as 3$^{rd}$ Generation, 4$^{th}$ Generation and 5$^{th}$ Generation standards, adopt new technologies, add new features, and increase data rates much faster than actual hardware developments and deployments. As a result, the capacity of a NodeB (or base station) platform (e.g., a hardware board such as a modem board) fills up quickly. This reduces the life cycle of a platform, which then requires more frequent development of new platforms. However, such development not only increases costs, but may delay product delivery time.

Conventionally, L1/L2 processing boards (also referred to as modem boards) at a NodeB utilize a single-board architecture (SBA). In this conventional architecture, each board is connected to all antennas, and performs both L2 scheduling and L1 processing for all cells in the NodeBs coverage area. As a result, all standard features are implemented on each board. This "one board for all" solution shortens the life cycle of the boards and limits the ability for additional features to be added to the boards.

SUMMARY

At least some example embodiments provide a multi-board architecture (MBA) for L1/L2 processing boards at a base station (e.g., NodeB, eNodeB, etc.).

The multi-board architecture according to one or more example embodiments reduces unnecessary resource consumption at base stations by decreasing duplicated functionality present in the conventional single board architecture. In one example, the L1/L2 processing boards process only a portion or fraction of the antenna streams as compared to the conventional single board architecture.

According to at least some example embodiments, scheduling for multiple carriers in a geographical coverage area is distributed among schedulers on different boards. For a multi-carrier user, scheduling of the user's transmissions on respective carriers is performed at different boards, thereby distributing the scheduling of the user's uplink and/or downlink transmissions among the boards. Although the scheduling of the user's transmissions are distributed, the schedulers are synchronized, rather than independent from one another.

At least one example embodiment provides a transceiver station providing wireless resources for cells on a plurality of carriers in a geographical coverage area, the transceiver station including: a first board including an anchor cell L2 scheduler configured to schedule at least one of uplink and downlink transmissions for a multi-carrier user on only a first of the plurality of carriers; and a second board including a secondary cell L2 scheduler configured to schedule at least one of uplink and downlink transmissions for the multi-carrier user on only a second of the plurality of carriers, the second board being separate from, but interconnected with the first board.

At least one other example embodiment provides a method for scheduling transmissions at a transceiver station providing wireless resources for cells on a plurality of carriers in a geographical coverage area, the method including: scheduling, at a first board, at least one of uplink and downlink transmissions for a multi-carrier user on only a first of the plurality of carriers; and scheduling, at a second board interconnected with the first board, at least one of uplink and downlink transmissions for the multi-carrier user on only a second of the plurality of carriers.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

Figure 1:
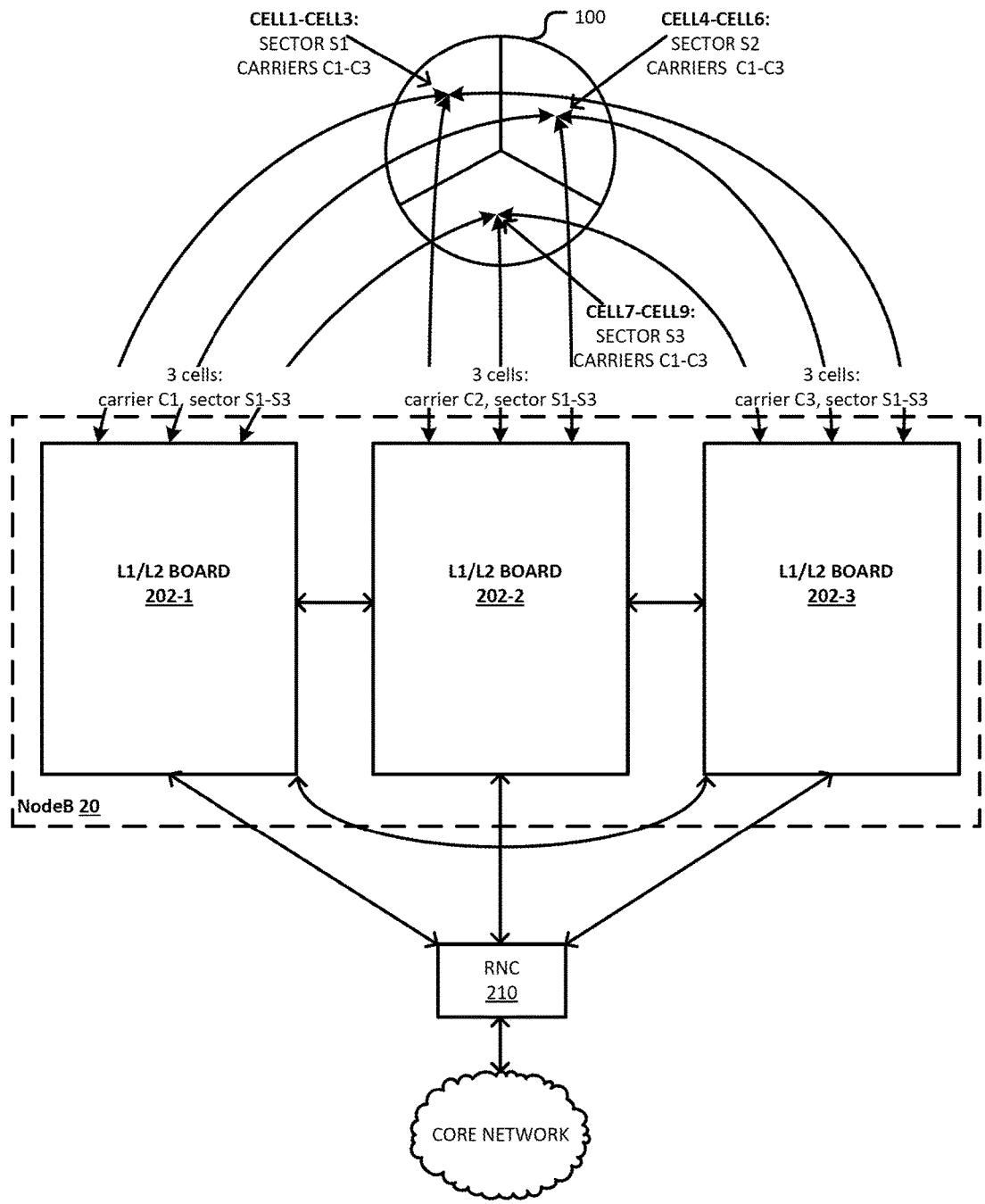
FIG. 1 illustrates a portion of a wireless communications network including a NodeB having a multi-board architecture (MBA) according to an example embodiment.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing base stations, NodeBs, eNodeBs, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "NodeB" may be considered synonymous to, and may hereafter be occasionally referred to as a Node B, base station, transceiver station, base transceiver station (BTS), etc., and describes a transceiver in communication with and providing wireless resources to users in a geographical coverage area. As discussed herein, NodeBs may have all functionally associated with conventional, well-known base stations in addition to the capability and functionality to perform the methods discussed herein.

For the sake of simplicity, the term NodeB is used herein to represent a NodeB for $3^{rd}$ Generation Wideband Code Division Multiple Access (WCDMA), an eNodeB for $4^{th}$ Generation Long Term Evolution (LTE), and a general base station for other wireless systems such as Code Division Multiple Access (CDMA), Worldwide Interoperability for Microwave Access (WiMax), undergoing $5^{th}$ Generation systems, etc.

The term "user" as discussed herein, may be considered synonymous to, and may hereafter be occasionally referred to, as a user equipment ("UE"), client, mobile unit, mobile station, mobile user, mobile, subscriber, user, remote station, access terminal, receiver, etc., and describes a remote user of wireless resources on one or more carriers in a wireless communication network. A multi-carrier user is a user capable of communicating via multiple carriers in the wireless network.

As discussed herein, uplink or reverse link transmissions refer to transmissions from user to NodeB (or network), whereas downlink or forward link transmissions refer to transmissions from NodeB (or network) to user. A carrier refers to a frequency bandwidth for a user. In a Wideband Code Division Multiple Access (WCDMA) network, a carrier is 5 MHz frequency bandwidth. In a Third Generation Partnership Project Long Term Evolution (3GPP LTE) network, a carrier may be 1.4 MHz, 3 MHz, 5 MHz, 10 MHz, 15 MHz or 20 MHz. In one example, a multi-carrier user in a WCDMA/LTE network may communicate via one or more of these carriers (or carrier bandwidths).

As described herein, L1 refers to Layer 1, L2 refers to layer 2, and a "board" or "processing board" refers to a L1/L2 baseband processing board.

Although example embodiments are discussed herein with regard to WCDMA and LTE, example embodiments may also be applied to other wireless technologies and systems such as CDMA, WiMAX, undergoing 5G systems, etc.

FIG. 1 illustrates a portion of a wireless network including a NodeB having a multi-board architecture (MBA) according to an example embodiment.

Referring to FIG. 1, the NodeB 20 serves users (not shown) in a geographical coverage area 100. In FIG. 1, the geographical coverage area 100 includes 9 radio-frequency (RF) cells (CELL1-CELL9) that are divided into 3 groups based on sector and carrier. RF cells CELL1-CELL3 are in sector S1, RF cells CELL4-CELL6 are in sector S2, and RF cells CELL7-CELL9 are in sector S3. In most instances, example embodiments will be discussed herein with regard to the geographical coverage area 100 being divided into 3 sectors, having 3 carriers and a total of 9 cells. However, it should be understood that example embodiments also apply to any number of carriers, any number of sectors per carrier, any number of cells, and any number of antennas per carrier. For the sake of clarity, one or more example embodiments will be described with regard to scheduling of transmissions for a single user on multiple carriers in a sector of the geographical coverage area.

The NodeB 20 is communicatively coupled to a radio network controller (RNC) 210. The RNC 210 is further coupled to a core network.

The RNC 210 carries out radio resource management as well as mobility management functions in the network. The RNC 210 also controls the NodeB 20. The RNC 210 sends and receives information from the core network as well as the NodeB 20. Because RNCs and their functionality are generally well-known, a further detailed description of RNC 210 is omitted.

Still referring to FIG. 1, the NodeB 20 includes a plurality of L1/L2 processing boards 202-1, 202-2 and 202-3. The L1/L2 processing boards 202-1, 202-2 and 202-3 are operatively coupled to one another so as to exchange information (e.g., scheduling information, synchronization information, user data, etc.) with one another. The L1/L2 processing boards 202-1, 202-2 and 202-3 are separate from, but interconnected with, one another at the NodeB 20.

In one example, the L1/L2 processing boards 202-1, 202-2 and 202-3 exchange information via L2 interface messages. In one example, L2 interface messages may include synchronization information, scheduling information and/or user data. The user data may include downlink data packets carrying payload data transmitted from or to be delivered to users in the geographical coverage area 100. The synchronization information may include synchronization information packets. In each synchronization information packet, an L2 scheduler informs another L2 scheduler of current configurations and parameters for each cell/user/channel operations. Upon receiving the synchronization information, the L2 scheduler knows priority information for sorting and sending data and control messages. More specifically, synchronization information packets may include, for example: cell and user configuration packets; downlink control packets; uplink Channel Quality Indicator (CQI) and Ack/Nack information packets decoded, etc.

Figure 2:
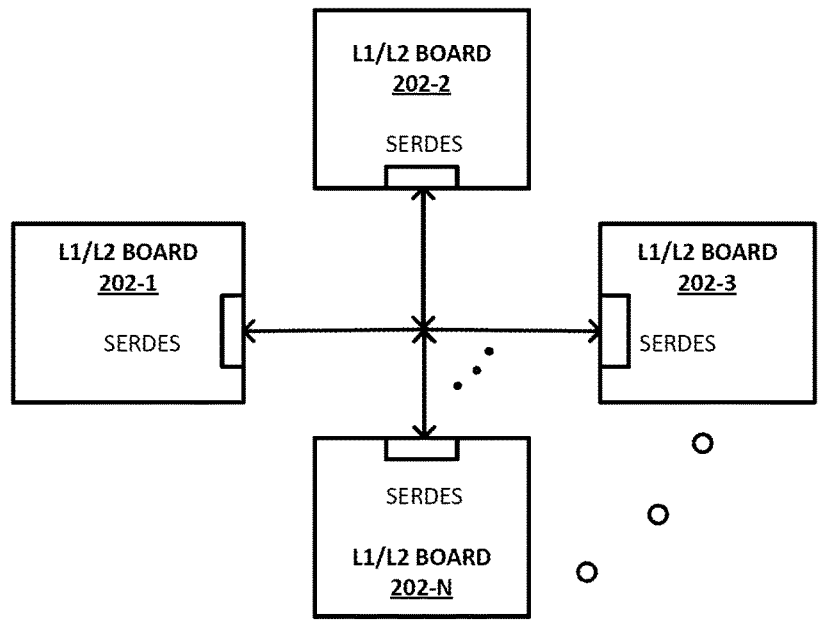
FIGS. 2 and 3 illustrate example interconnection configurations of L1/L2 processing boards at a NodeB.
Figure 3:
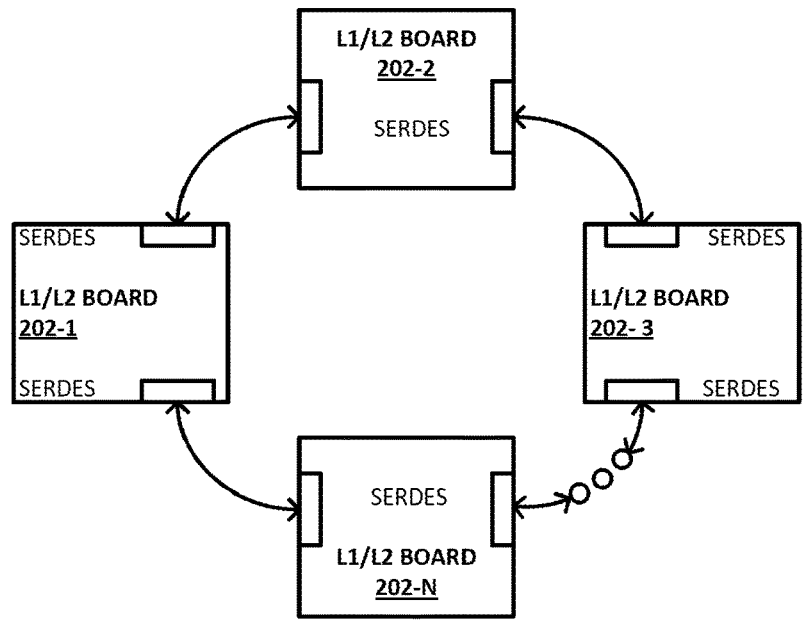

The L1/L2 processing boards 202-1, 202-2 and 202-3 shown in FIG. 1 may be coupled to one another in various ways. FIGS. 2 and 3 illustrate example configurations for inter-board links between N L1/L2 processing boards at a NodeB, such as NodeB 20. In the example embodiment shown in FIG. 1, N=3. However, example embodiments are not limited to this example.

In more detail, FIG. 2 illustrates a star topology for connecting N L1/L2 processing boards 202-1, 202-2, 202-3, ..., 202-N. In the example shown in FIG. 2, each L1/L2 processing board has a single serializer/deserializer (SERDES) I/O port for exchanging information with other L1/L2 processing boards.

FIG. 3 illustrates a ring topology for interconnecting the N L1/L2 processing boards 202-1, 202-2, 202-3, ..., 202-N. In this example, each L1/L2 processing board has 2 SERDES I/O ports exchanging information with other L1/L2 processing boards.

In the example configurations shown in FIGS. 2 and 3, each of the interconnection configurations utilizes a high speed SERDES physical link, such as a serial RapidIO (sRIO) industry standard link. However, example embodiments should not be limited to these examples.

Although only ring and star topologies are discussed herein, the L1/L2 processing boards may be interconnected using any suitable interconnection topology.

Figure 4:
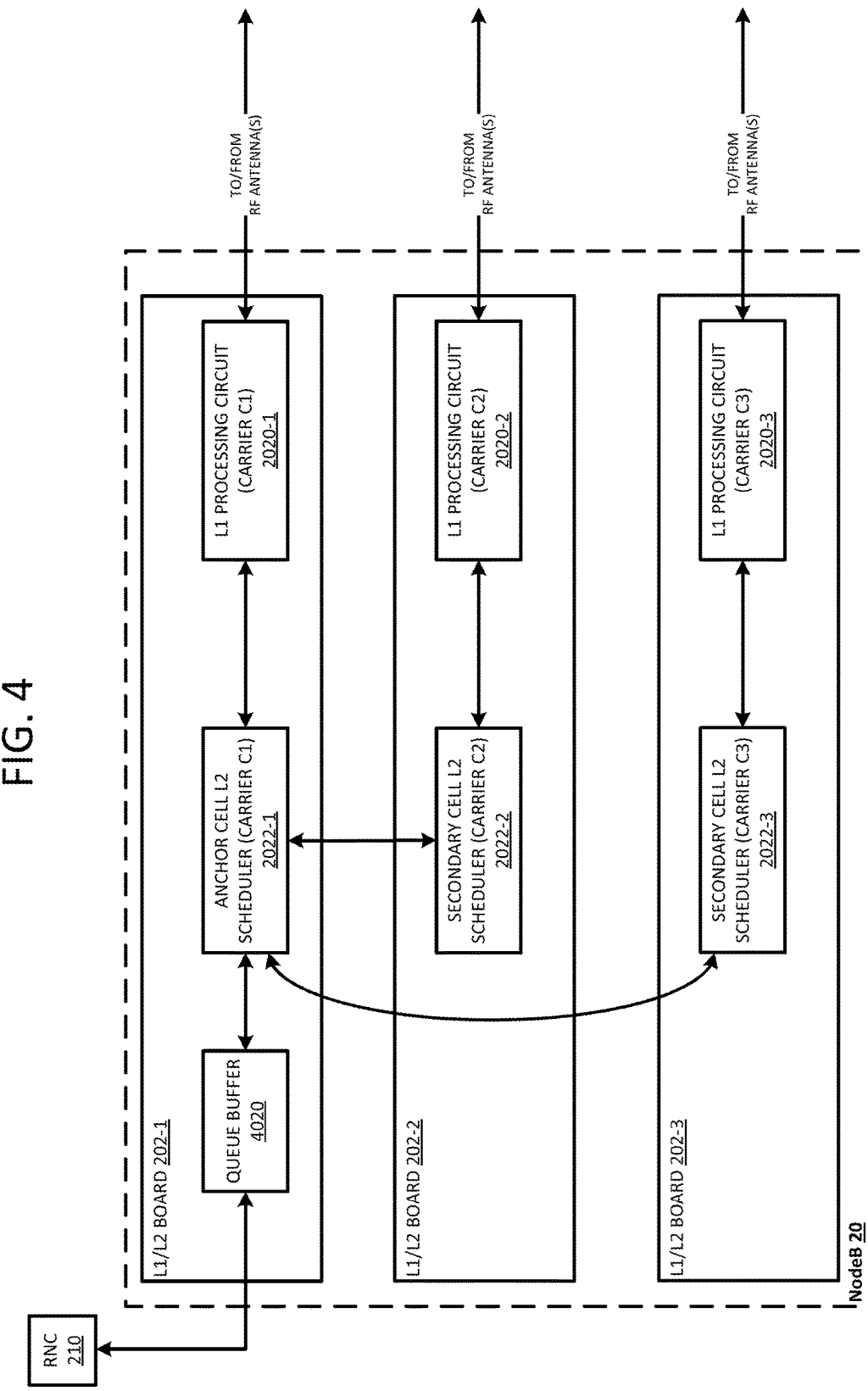
FIG. 4 is a block diagram illustrating an example embodiment of the NodeB 20 in more detail.

FIG. 4 is a block diagram illustrating an example embodiment of the NodeB 20 in more detail.

Referring to FIG. 4, the L1/L2 processing board 202-1 includes a queue buffer 4020 operatively coupled to an anchor cell L2 scheduler 2022-1. The anchor cell L2 scheduler 2022-1 is operatively coupled to anchor cell L1 processing circuit 2020-1. The anchor cell L1 processing circuit 2020-1 is operatively coupled to multiple (e.g., 2) radio frequency (RF) antennas for carrier C1.

The L1/L2 processing board 202-2 includes a secondary cell L2 scheduler 2022-2 operatively coupled to a secondary cell L1 processing circuit 2020-2. The secondary cell L1 processing circuit 2020-2 is operatively coupled to multiple (e.g., 2) radio frequency (RF) antennas for carrier C2.

The L1/L2 processing board 202-3 includes a secondary cell L2 scheduler 2022-3 operatively coupled to a secondary cell L1 processing circuit 2020-3. The secondary cell L1 processing circuit 2020-3 is operatively coupled to multiple (e.g., 2) radio frequency (RF) antennas for carrier C3.

As mentioned above, the L1/L2 processing boards 202-1, 202-2, and 202-3 are interconnected with one another. In this regard, in the example embodiment shown in FIG. 4 the anchor cell L2 scheduler 2022-1 is operatively connected to each of the secondary cell L2 schedulers 2022-2 and 2022-3.

Example operation of the L1/L2 processing boards 202-1, 202-2 and 202-3 as well as the components thereof will be discussed in more detail below with regard to FIGS. 6-9.

Figure 5:
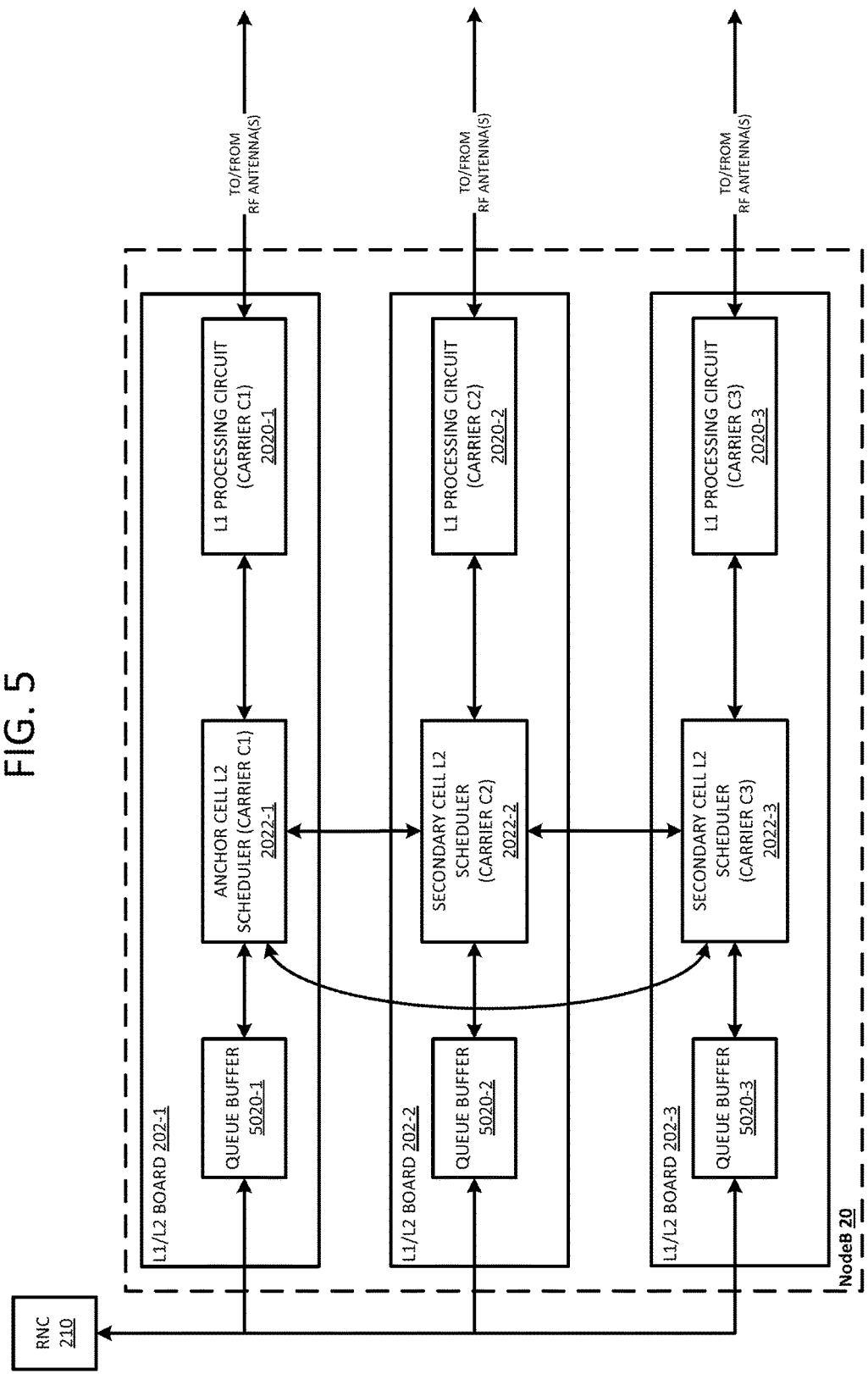
FIG. 5 is a block diagram illustrating another example embodiment of the NodeB 20 in more detail.

FIG. 5 is a block diagram illustrating another example embodiment of the NodeB 20 in more detail. As described in more detail below, the example embodiment shown in FIG. 5 is similar to the example embodiment shown in FIG. 4, except that each L1/L2 processing board 202-1, 202-2 and 202-3 includes a queue buffer, each of the anchor cell L2 scheduler 2022-1, the secondary cell L2 scheduler 2022-2 and the secondary cell L2 scheduler 2022-3 receives information from the RNC 210 via its respective queue buffer, and each of the anchor cell L2 scheduler 2022-1, the secondary cell L2 scheduler 2022-2 and the secondary cell L2 scheduler 2022-3 performs the same algorithm to process/schedule uplink and/or downlink transmit data. In this example embodiment, the L1/L2 processing boards 202-1, 202-2 and 202-3 need not exchange user payload data with one another. Rather, the L1/L2 processing boards 202-1, 202-2, and 202-3 need only exchange synchronization information as will be discussed in more detail later.

In more detail with regard to FIG. 5, the L1/L2 processing board 202-1 includes a queue buffer 5020-1 operatively coupled to the RNC 210 and the anchor cell L2 scheduler 2022-1. The anchor cell L2 scheduler 2022-1 is operatively coupled to the anchor cell L1 processing circuit 2020-1. The anchor cell L1 processing circuit 2020-1 is operatively coupled to multiple (e.g., 2) radio frequency (RF) antennas for carrier C1.

The L1/L2 processing board 202-2 includes a queue buffer 5020-2 operatively coupled to the RNC 210 and the secondary cell L2 scheduler 2022-2. The secondary cell L2 scheduler 2022-2 is operatively coupled to the secondary cell L1 processing circuit 2020-2. The secondary cell L1 processing circuit 2020-2 is operatively coupled to multiple (e.g., 2) radio frequency (RF) antennas for carrier C2.

The L1/L2 processing board 202-3 includes a queue buffer 5020-3 operatively coupled to the RNC 210 and the secondary cell L2 scheduler 2022-3. The secondary cell L2 scheduler 2022-3 is operatively coupled to the secondary cell L1 processing circuit 2020-3. The secondary cell L1 processing circuit 2020-3 is operatively coupled to multiple (e.g., 2) radio frequency (RF) antennas for carrier C3.

As mentioned above, the L1/L2 processing boards 202-1, 202-2, and 202-3 are interconnected with one another. In the example embodiment shown in FIG. 5, the anchor cell L2 scheduler 2022-1, the secondary cell L2 scheduler 2022-2 and the secondary cell L2 scheduler 2022-3 are operatively connected with one another so as to enable exchange of L2 messages including synchronization information between the schedulers.

Example operation of the example embodiment shown in FIG. 5 as well as the components thereof will be discussed in more detail below with regard to FIGS. 7, 8, 10 and 11.

According to example embodiments, the L1 processing circuits and/or the L2 schedulers shown in FIGS. 4 and 5 may be hardware, firmware, hardware executing software or any combination thereof. When the L1 processing circuits and/or the L2 schedulers are hardware, such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions of the L1 processing circuits and/or the L2 schedulers. CPUs, SOCs, DSPs, ASICs and FPGAs may generally be referred to as processors and/or microprocessors.

For simplification and clarity of description, as similarly mentioned above example embodiments will be described with regard to a 3-carrier user, and with regard to the NodeB 20 being configured for 3 carriers (C1, C2, C3) within the geographical coverage area 100, 3 sectors (S1, S2, S3) per carrier, and 2 RF antennas per carrier. More specifically, FIGS. 6-11 will be described with regard to a single multi-carrier user in sector S1 of the geographical coverage area 100 shown in FIG. 1. It should be understood, however, that example embodiments are applicable to a NodeB configured for any number of carriers, and to multi-carrier users capable of communicating on any number of carriers (e.g., 2 or more carriers) in a wireless network, such as a LTE network.

Further, although example embodiments are described with regard to 3 sectors (S1, S2, S3), each of sectors S1, S2, and S3 may represent a subset of sectors, where each subset includes one or more sectors. In this example, each subset of sectors may be different. Although example embodiments are described with regard to 3 carriers (C1, C2, C3), each of carriers C1, C2, and C3 may represent a subset of carriers, where each subset includes one or more carriers. In this example, each subset of carriers may be different, and more particularly, each carrier in one subset of carriers may be different from the carriers in a second subset of carriers.

As mentioned above, the NodeB 20 has 2 RF antennas per carrier. As mentioned above, the two RF antennas for carrier C1 are connected to the anchor cell L1 processing circuit 2020-1 at the L1/L2 processing board 202-1; the two RF antennas for carrier C2 are connected to the secondary cell L1 processing circuit 2020-2 at the L1/L2 processing board 202-2; and the two RF antennas for carrier C3 are connected to the secondary cell L1 processing circuit 2020-3 at the L1/L2 processing board 202-3. As a result, the 9 cells CELL1-CELL9 provided by the NodeB 20 are distributed among the 3 L1/L2 processing boards 202-1, 202-2, and 202-3. In this example, the cells are distributed evenly among the L1/L2 processing boards 202-1, 202-2 and 202-3. However, it should be understood that example embodiments are not limited to this even distribution.

According to at least some example embodiments, each L1/L2 processing board performs L1 processing and/or L2 scheduling for uplink and/or downlink transmissions for users within cells on a per-carrier basis.

In more detail, for example, the L1/L2 processing board 202-1 performs L1 processing and L2 scheduling operations for only cells CELL1, CELL4, CELL7 on carrier C1; the L1/L2 processing board 202-2 performs L1 processing and L2 scheduling operations for only cells CELL2, CELL5, CELL8 on carrier C2; and the L1/L2 processing board 202-3 performs L1 processing and L2 scheduling operations for only cells CELL3, CELL6, CELL9 on carrier C3.

When configured in the manner described above, resource consumption of each L1/L2 processing board at the NodeB 20 is reduced from processing 9 cells in connection with the conventional single board architecture (SBA) to 3 cells in this example.

Example operation of the NodeB 20 and components thereof shown in FIG. 4 will now be described in more detail below with regard to FIGS. 6-9. For the sake of clarity, example operation of the NodeB 20 will be described with regard to scheduling of transmissions for a single multi-carrier user in a sector of the geographical coverage area. In the example discussed below, it is assumed that the user is located in sector S1 and that the user is a 3-carrier user, with carrier C1 being the user's primary carrier and cell CELL1 being the user's anchor cell. It should be understood, however, that similar processes may be performed for one or more (e.g., a plurality of) users in one or more sectors of a geographical coverage area of a NodeB, such as NodeB 20.

Figure 6:
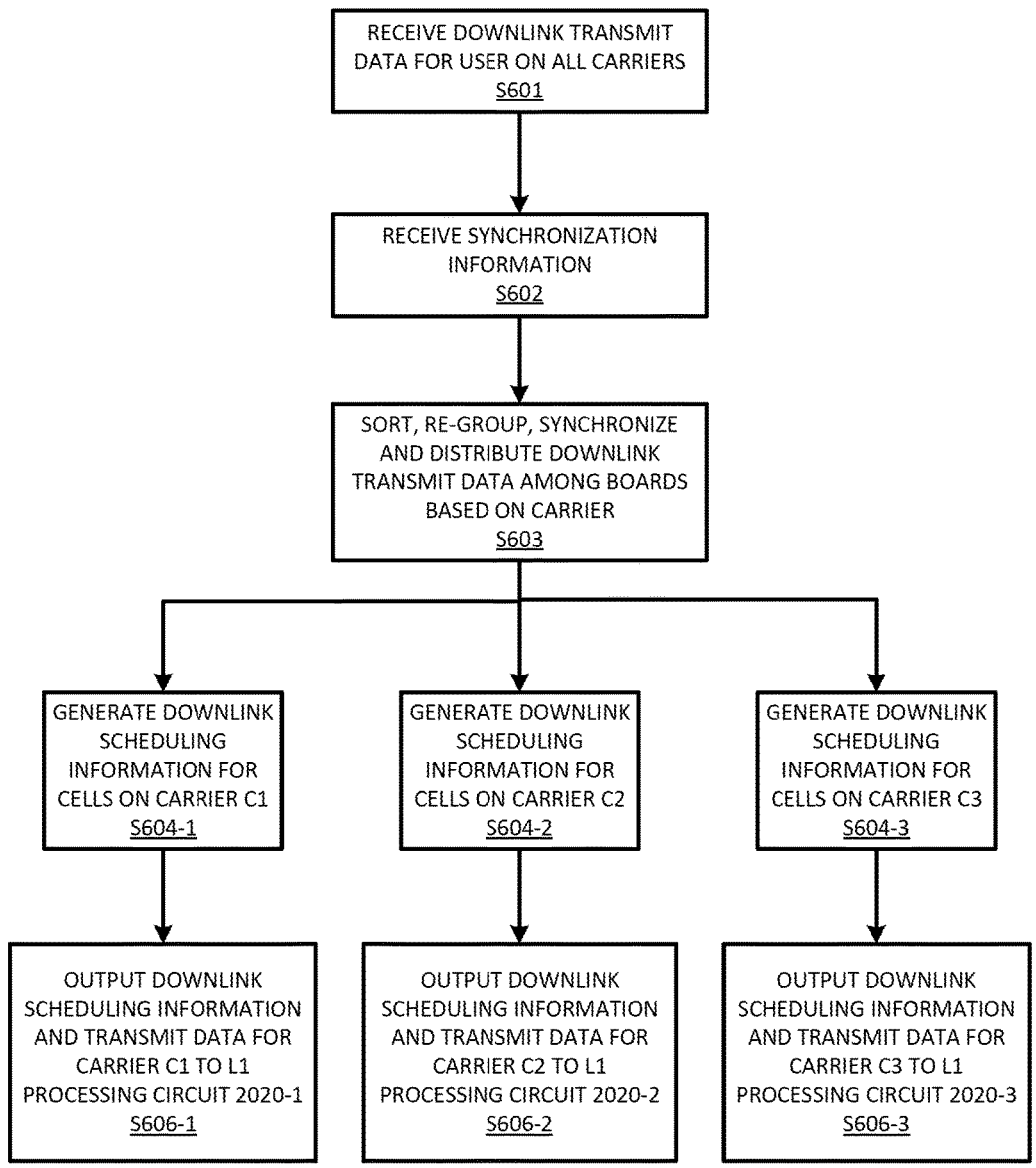
FIG. 6 is a flow chart illustrating example functionality/operation of an example embodiment of L2 schedulers when the data transmission flow to a user is in the downlink direction.
Figure 7:
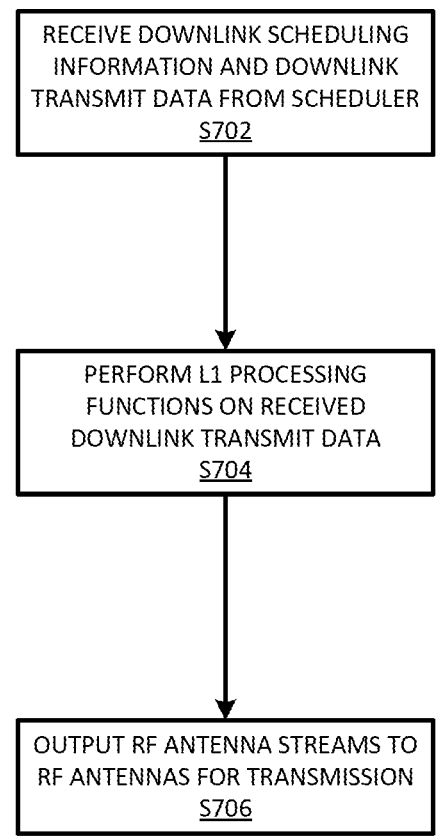
FIG. 7 is a flow chart illustrating example functionality/operation of an example embodiment of L1 processing circuits when the data transmission flow to a user is in the downlink direction.

FIG. 6 is a flow chart illustrating example functionality/operation of an example embodiment of L2 schedulers when the data transmission flow to a user is in the downlink direction. FIG. 7 is a flow chart illustrating example functionality/operation of an example embodiment of L1 processing circuits when the data transmission flow to a user is in the downlink direction.

Taken together, FIGS. 6 and 7 are flow charts illustrating a method for scheduling downlink transmissions for a user according to an example embodiment.

Referring to FIG. 6, at step S601 the L1/L2 processing board 202-1 receives downlink transmit data for a user in sector S1 on each of carriers C1-C3 from the RNC 210. The received downlink transmit data is buffered in the queue buffer 4020. The queue buffer 4020 then outputs the downlink transmit data for the user to the anchor cell L2 scheduler 2022-1.

At step S602, the anchor cell L2 scheduler 2022-1 receives synchronization information from the secondary cell L2 schedulers 2022-2 and 2022-3. In each synchronization information packet, the secondary cell L2 schedulers 2022-2 and 2022-3 inform the anchor cell L2 scheduler 2022-1 of current configurations and parameters for each cell/user/channel operations. Upon receiving the synchronization information, the anchor cell L2 scheduler 2022-1 knows priority information for sorting and sending data and control messages in the queue buffer 4020 to the secondary cell L2 schedulers 2022-2 and 2022-3.

At step S603, the anchor cell L2 scheduler 2022-1 synchronizes, sorts and re-groups the queued downlink transmit data for the user on a per-carrier basis (carrier-by-carrier). In so doing, the anchor cell L2 scheduler 2022-1 generates a group (or set) of synchronized downlink transmit data to be transmitted to the user on each of carriers C1-C3.

Still referring to step S603, the anchor cell L2 scheduler 2022-1 then distributes the synchronized downlink transmit data for the user among the anchor cell L2 scheduler 2022-1, the secondary cell L2 scheduler 2022-2 and the secondary cell L2 scheduler 2022-3 on a per-carrier (or per-cell) basis. In so doing, the anchor cell L2 scheduler 2022-1 sends the synchronized set of downlink transmit data for each respective carrier to a corresponding L2 scheduler.

At step S604-1, the anchor cell L2 scheduler 2022-1 generates downlink scheduling information for the user on carrier C1 (CELL1 downlink scheduling information) to schedule transmission of downlink transmit data (also referred to herein as downlink data transmissions) to the user on carrier C1. As discussed herein, downlink scheduling information may also be referred to as downlink control information, and may include one or more downlink control packets. The one or more downlink control packets may include user/cell configuration information, downlink control information, which provides timing information, control signal information, channel format information, and transmitter parameters for transmission on the downlink. The downlink data packet is organized into one or multiple transmit blocks with messages to be sent to a user. The scheduled downlink transmit data (or downlink data transmissions) may include one or more downlink data packets. The one or more downlink data packets carry payload data for delivery to, for example, a destination user.

At step S604-2 the secondary cell L2 scheduler 2022-2 generates downlink scheduling information for the user on carrier C2 (CELL2 downlink scheduling information) to schedule downlink data transmissions to the user on carrier C2.

At step S604-3, the secondary cell L2 scheduler 2022-3 generates downlink scheduling information for the user on carrier C3 (CELL3 downlink scheduling information) to schedule downlink data transmissions to the user on carrier C3.

The scheduling operations in steps S604-1, S604-2 and S604-3 schedule downlink data transmissions for the user on each of carriers C1-C3 such that the user receives data transmissions on the downlink via the 3 carriers C1, C2, C3.

In more detail, for example, at step S604-1 the anchor cell L2 scheduler 2022-1 allocates resources for downlink data transmission to the user on carrier C1. In so doing, the anchor cell L2 scheduler 2022-1 performs functions such as: adding and removing downlink channels; determining time windows for transmitting downlink channels to users; maintaining power balance by calculating proper/appropriate transmitting power for each channel to reach higher signal-to-noise (SNR) and lower interference to other channels and/or other users; scheduling a re-transmission if a Nack signal is detected for a last transmission, etc. Each of the secondary cell L2 schedulers 2022-2 and 2022-3 perform similar functions for the user on respective carriers C2 and C3.

At step S606-1, the anchor cell L2 scheduler 2022-1 outputs the user's downlink scheduling information and the scheduled downlink transmit data for transmission on carrier C1 to the anchor cell L1 processing circuit 2020-1. In so doing, the anchor cell L2 scheduler 2022-1 sends one or more downlink control packets and one or more downlink data packets for the user to the anchor cell L1 processing circuit 2020-1.

At step S606-2, the secondary cell L2 scheduler 2022-2 outputs the user's downlink scheduling information and the scheduled downlink transmit data for transmission on carrier C2 to the secondary cell L1 processing circuit 2020-2. In so doing, the secondary cell L2 scheduler 2022-2 sends one or more downlink control packets and one or more downlink data packets for the user to the secondary cell L1 processing circuit 2020-2.

At step S606-3, the secondary cell L2 scheduler 2022-3 outputs the user's downlink scheduling information and the scheduled downlink transmit data for transmission on carrier C3 to the secondary cell L1 processing circuit 2020-3. In so doing, the secondary cell L2 scheduler 2022-3 sends one or more downlink control packets and one or more downlink data packets for the user to the secondary cell L1 processing circuit 2020-3.

Turning now to FIG. 7, at step S702 the anchor cell L1 processing circuit 2020-1 receives the downlink scheduling information and downlink transmit data for transmission to the user on carrier C1 from the anchor cell L2 scheduler 2022-1. Also at step S702, the secondary cell L1 processing circuit 2020-2 receives the downlink scheduling information and downlink transmit data for transmission to the user on carrier C2 from the secondary cell L2 scheduler 2022-2, and the secondary cell L1 processing circuit 2020-3 receives the downlink scheduling information and downlink transmit data for transmission to the user on carrier C3 from the secondary cell L2 scheduler 2022-3.

At step S704, the anchor cell L1 processing circuit 2020-1 performs L1 processing functions on received downlink transmit data for the user to generate a RF stream to be transmitted to the user on carrier C1. More specifically, at step S704, based on the received downlink scheduling information, the anchor cell L1 processing circuit 2020-1 further encodes the received downlink data packets and modulates the encoded data into a RF stream.

Also at step S704, the secondary cell L1 processing circuit 2020-2 performs L1 processing functions on received downlink transmit data for the user to generate a RF stream to be transmitted to the user on carrier C2, and the secondary cell L1 processing circuit 2020-3 performs L1 processing functions on received downlink transmit data for the user to generate a RF stream to be transmitted to the user on carrier C3.

At step S706, the anchor cell L1 processing circuit 2020-1 outputs the RF stream (also referred to herein as final downlink transmit data) to the RF antennas coupled to the L1/L2 processing board 202-1 for transmission to the user on carrier C1. Also at step S706, the secondary cell L1 processing circuit 2020-2 outputs the RF stream to the RF antennas coupled to the L1/L2 processing board 202-2 for transmission to the user on carrier C2, and the secondary cell L1 processing circuit 2020-3 outputs the RF stream to the RF antennas coupled to the L1/L2 processing board 202-3 for transmission to the user on carrier C3.

The RF antenna streams (also referred to as final downlink transmit data) are then transmitted to the user on carriers C1-C3 by respective RF antennas.

Figure 8:
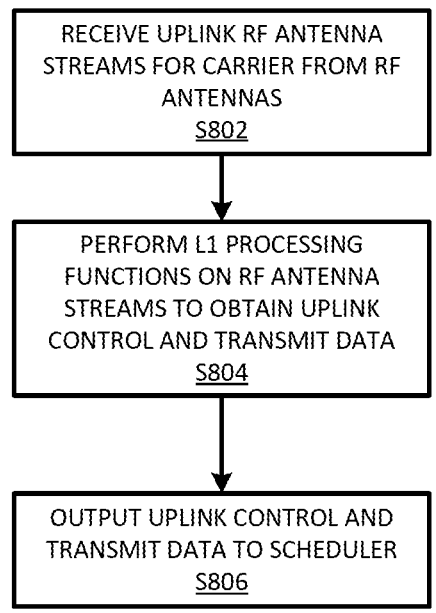
FIG. 8 is a flow chart illustrating example functionality/operation of example embodiment of L1 processing circuits when the data transmission flow to a user is in the uplink direction.

FIG. 8 is a flow chart illustrating example functionality/operation of example embodiment of L1 processing circuits when the data transmission flow to a user is in the uplink direction.

Figure 9:
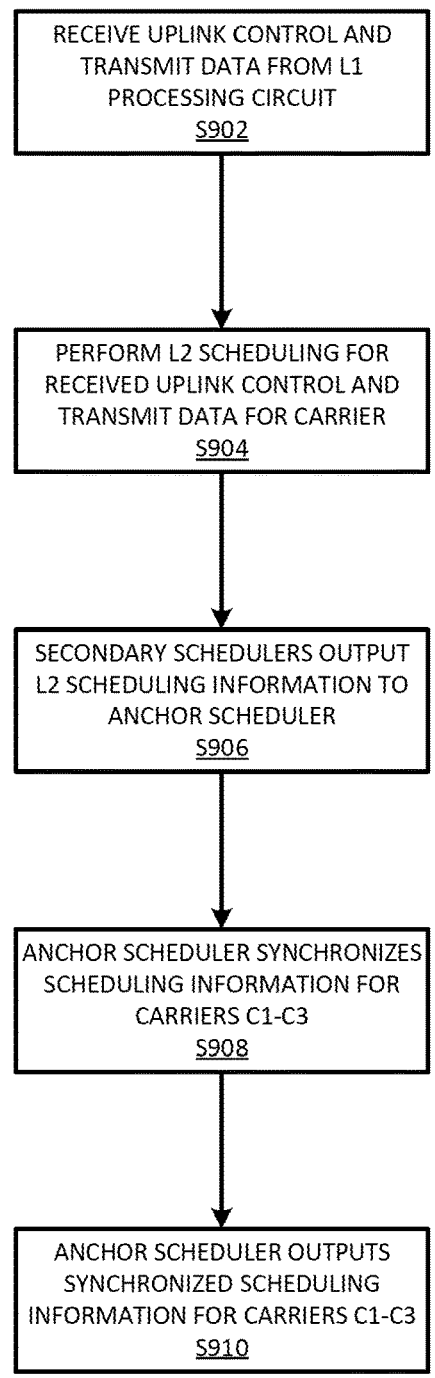
FIG. 9 is a flow chart illustrating example functionality/operation of an example embodiment of L2 schedulers when the data transmission flow to a user is in the uplink direction.

FIG. 9 is a flow chart illustrating example functionality/operation of an example embodiment of L2 schedulers when the data transmission flow to a user is in the uplink direction.

Taken together, FIGS. 8 and 9 are flow charts illustrating a method for scheduling uplink transmit data.

Referring to FIG. 8, at step S802 the anchor cell L1 processing circuit 2020-1 receives one or more RF antenna streams including uplink transmit data transmitted by the user on carrier C1; the secondary cell L1 processing circuit 2020-2 receives one or more RF antenna streams including uplink transmit data transmitted by the user on carrier C2; and the secondary cell L1 processing circuit 2020-3 receives one or more RF antenna streams including uplink transmit data transmitted by the user on carrier C3. In one example, the uplink transmit data includes control information or messages for scheduling uplink transmissions received on an uplink control channel, as well as payload data transmitted by the user on an uplink data channel.

At step S804, the anchor cell L1 processing circuit 2020-1 performs L1 processing functions on the received one or more RF antenna streams transmitted by the user on carrier C1. In one example, the anchor cell L1 processing circuit 2020-1 de-modulates and decodes the received RF antenna streams to recover one or more bit sequences sent by the user on the uplink data channel on carrier C1. The anchor cell L1 processing circuit 2020-1 also decodes CQI and Ack/Nack messages on the uplink control channel for the user on carrier C1.

Still referring to step S804, the secondary cell L1 processing circuit 2020-2 performs L1 processing functions on the received one or more RF antenna streams transmitted by the user on carrier C2, and the secondary cell L1 processing circuit 2020-3 performs L1 processing functions on the received one or more RF antenna streams transmitted by the user on carrier C3. The L1 processing functions performed by the secondary cell L1 processing circuits 2020-2 and 2020-3 are the same as the L1 processing functions performed by the anchor cell L1 processing circuit 2020-1.

The decoded information obtained by the L1 processing circuits may also be referred to herein as uplink control and transmit data.

At step S806, the anchor cell L1 processing circuit 2020-1 outputs the uplink control and transmit data received from the user on carrier C1 to the anchor cell L2 scheduler 2022-1. Also at step S806, the secondary cell L1 processing circuit 2020-2 outputs the uplink control and transmit data received from the user on carrier C2 to the secondary cell L2 scheduler 2022-2, and the secondary cell L1 processing circuit 2020-3 outputs the uplink control and transmit data received from the user on carrier C3 to the secondary cell L2 scheduler 2022-3.

Turning now to FIG. 9, at step S902 the anchor cell L2 scheduler 2022-1 receives the uplink control and transmit data output from the anchor cell L1 processing circuit 2020-1. Also at step S802, the secondary cell L2 scheduler 2022-2 receives the uplink control and transmit data output from the secondary cell L1 processing circuit 2020-2, and the secondary cell L2 scheduler 2022-3 receives the uplink control and transmit data output from the secondary cell L1 processing circuit 2020-3.

At step S904, the anchor cell L2 scheduler 2022-1 performs L2 scheduling operations on the uplink control and transmit data output from anchor cell L1 processing circuit 2020-1. For example, the anchor cell L2 scheduler 2022-1 generates uplink scheduling information for the user. In more detail with regard to step S904 the anchor cell L2 scheduler 2022-1 performs uplink L2 scheduling operations for the user. The uplink scheduling information may also be referred to as uplink control and transmit information.

Also at step S904, the secondary cell L2 scheduler 2022-2 performs L2 scheduling operations on the uplink control and transmit data output from secondary cell L1 processing circuit 2020-2 to generate uplink scheduling information for the user with regard to carrier C2, and the secondary cell L2 scheduler 2022-3 performs L2 scheduling operations on the uplink control and transmit data output from secondary cell L1 processing circuit 2020-3 to generate uplink scheduling information for the user with regard to carrier C3.

At step S906, the secondary cell L2 scheduler 2022-2 outputs the uplink scheduling information for the uplink control and transmit data transmitted by the user on carrier C2 to the anchor cell L2 scheduler 2022-1, and the secondary cell L2 scheduler 2022-3 outputs the uplink scheduling information for the uplink control and transmit data transmitted by the user on carrier C3 to the anchor cell L2 scheduler 2022-1.

At step S908, the anchor cell L2 scheduler 2022-1 synchronizes the uplink scheduling information for the user among the carriers C1-C3. For example, the anchor cell L2 scheduler 2022-1 synchronizes timing information, resource allocation, resource capacity, etc. for the user's uplink transmission. The synchronization performed by the anchor cell L2 scheduler 2022-1 may be performed in any well-known manner, and will not be described in detail herein.

At step S910, the anchor cell L2 scheduler 2022-1 outputs the synchronized uplink scheduling information to the queue buffer 4020 for output to the RNC 210 and further processing and transmission of data on the uplink.

According to at least some example embodiments, one or more of the anchor cell L2 scheduler 2022-1, the secondary cell L2 scheduler 2022-2 and the secondary cell L2 scheduler 2022-3 also monitors downlink channel quality by receiving and analyzing CQI and Ack/Nack signaling to determine the channel quality and data error for a last downlink transmission. In another example, one or more of the anchor cell L2 scheduler 2022-1, the secondary cell L2 scheduler 2022-2 and the secondary cell L2 scheduler 2022-3 may monitor uplink channel quality in a similar manner.

By combining CQI, Ack/Nack, bit error rate and other control information, one or more of the anchor cell L2 scheduler 2022-1, the secondary cell L2 scheduler 2022-2 and the secondary cell L2 scheduler 2022-3 determines next scheduling actions, such as maintaining current state of operation, requesting user retransmission, adjusting channel power, removing the channel, etc.

Figure 10:
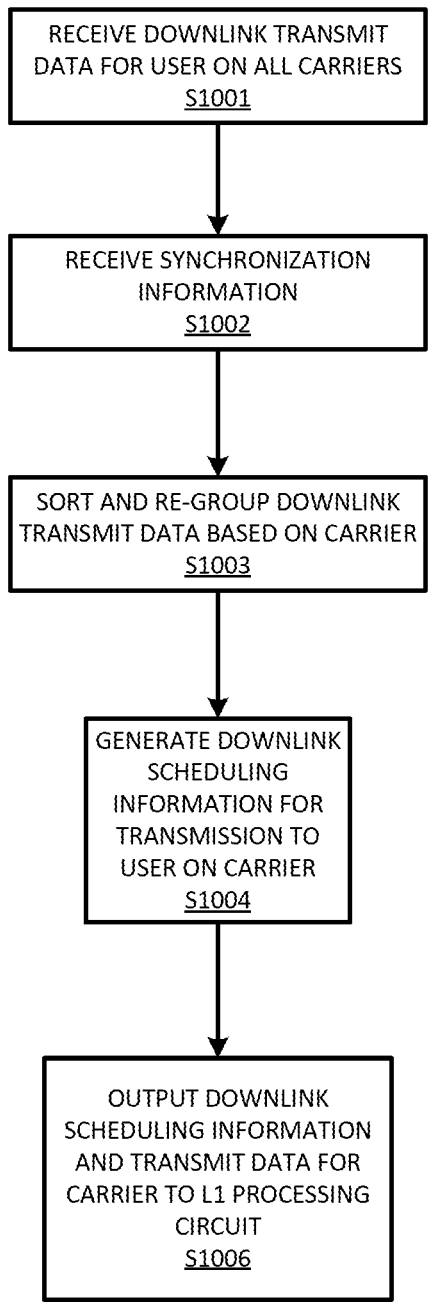
FIG. 10 is a flow chart illustrating example functionality/operation of another example embodiment of an L2 scheduler when the data transmission flow to a user is in the downlink direction.

FIG. 10 is a flow chart illustrating example functionality/operation of the NodeB 20 shown in FIG. 5 when the data transmission flow to a user is in the downlink direction (i.e., from NodeB to user). For the sake of clarity, FIG. 10 will be described with regard to the example embodiment of the L1/L2 processing board 202-1 shown in FIG. 5. However, it should be understood that each of L1/L2 processing boards 202-2 and 202-3 shown in FIG. 5 operate in the same or substantially the same manner with respect to carriers C2 and C3, respectively.

Referring to FIG. 10, at step S1001 the L1/L2 processing board 202-1 receives downlink transmit data for transmission to a user on carriers C1-C3 from the RNC 210. The received downlink transmit data is buffered in the queue buffer 5020-1. The queue buffer 5020-1 then outputs the downlink transmit data for the user to the anchor cell L2 scheduler 2022-1.

At step S1002, the anchor cell L2 scheduler 2022-1 receives synchronization information from the secondary cell L2 schedulers 2022-2 and 2022-3. The synchronization information is the same as that discussed above with regard to FIGS. 4 and 6-9.

At step S1003, the anchor cell L2 scheduler 2022-1 sorts and re-groups the queued downlink transmit data on a per-carrier basis (carrier-by-carrier) in the same manner as discussed above with regard to step S603 in FIG. 6. In so doing, the anchor cell L2 scheduler 2022-1 generates a group (or set) of downlink transmit data to be transmitted to the user on carrier C1 from among the received downlink transmit data from the RNC 210.

At step S1004, the anchor cell L2 scheduler 2022-1 generates downlink scheduling information for the user on carrier C1 (CELL1 downlink scheduling information) to schedule transmission of downlink transmission data (also referred to herein as downlink data transmissions) to the user on carrier C1 in the same manner as discussed above with regard to step S604-1 in FIG. 6. As discussed herein, downlink scheduling information may also be referred to as downlink control information, and may include one or more downlink control packets.

Still referring to step S1004, the anchor cell L2 scheduler 2022-1 generates the scheduling information using the synchronization information from the secondary schedulers 2022-2 and 2022-3 such that the downlink data transmissions to the user on carrier C1 are synchronized with the scheduled downlink data transmissions to the user on carriers C2 and C3.

At step S1006, the anchor cell L2 scheduler 2022-1 outputs the user's downlink scheduling information and the scheduled downlink transmit data for transmission to the user on carrier C1 to the anchor cell L1 processing circuit 2020-1 in the same manner as discussed above with regard to step S606-1 in FIG. 6.

For downlink communications, the anchor cell L1 processing circuit 2020-1, the secondary cell L1 processing circuit 2020-2 and the secondary cell L1 processing circuit 2020-3 shown in FIG. 5 operate in the same manner as discussed above with regard to FIGS. 4 and 7. Therefore, a detailed discussion of these processing circuits for downlink transmissions is omitted.

Still referring to the example embodiment shown in FIG. 5, for uplink communications, the anchor cell L1 processing circuit 2020-1, the secondary cell L1 processing circuit 2020-2 and the secondary cell L1 processing circuit 2020-3 operate in the same manner as discussed above with regard to FIGS. 4 and 8. Therefore, a detailed discussion of the operation of these L1 processing circuits for uplink transmissions is omitted.

Figure 11:
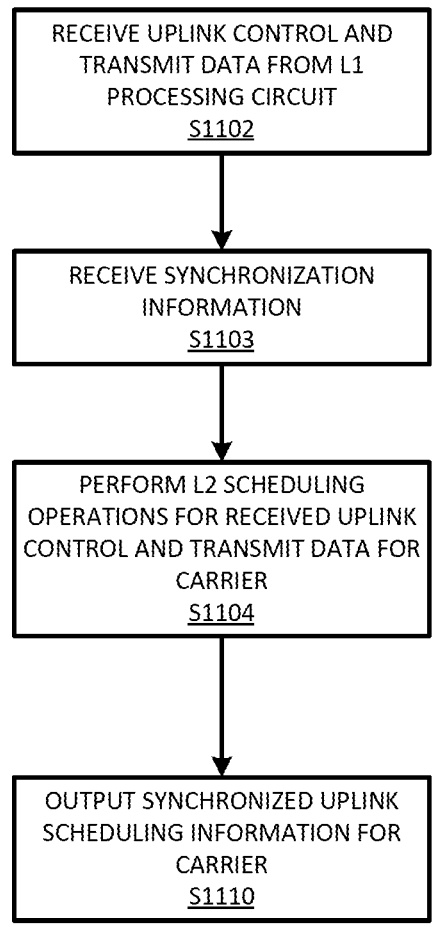
FIG. 11 is a flow chart illustrating example functionality/operation of another example embodiment of an L2 scheduler when the data transmission flow to a user is in the uplink direction.

FIG. 11 is a flow chart illustrating example functionality/operation of the NodeB 20 shown in FIG. 5 when the data transmission flow to a user is in the uplink direction (i.e., from user to NodeB). As with FIG. 10, for the sake of clarity, FIG. 11 will be described with regard to L1/L2 processing board 202-1. However, it should be understood that each of L1/L2 processing boards 202-2 and 202-3 operate in the same or substantially the same manner with respect to carriers C2 and C3, respectively.

In the example embodiment shown in FIG. 5, only control information (or synchronization information) need be communicated between the different boards. All data (including both uplink and downlink) packets are processed at respective local boards since both L1 and L2 processing for a given carrier is performed at the local board.

Referring to FIG. 11, at step S1102 the anchor cell L2 scheduler 2022-1 receives uplink control and transmit data received from the user on carrier C1 from the anchor cell L1 processing circuit 2020-1.

At step S1103, the anchor cell L2 scheduler 2022-1 receives synchronization information from the secondary cell L2 schedulers 2022-2 and 2022-3. The synchronization information is the same as that discussed above with regard to FIGS. 6-10.

At step S1104, the anchor cell L2 scheduler 2022-1 performs L2 scheduling operations for received uplink control and transmit data transmitted by the user on carrier C1. For example, the anchor cell L2 scheduler 2022-1 generates uplink scheduling information for uplink control and transmit data from the user on carrier C1.

In more detail with regard to step S1104 the anchor cell L2 scheduler 2022-1 performs uplink L2 scheduling operations for the uplink control and transmit data received from the user on carrier C1. The uplink scheduling information may also be referred to as uplink control and transmit information.

In performing the L2 scheduling operations at step S1104, the anchor cell L2 scheduler 2022-1 synchronizes the uplink scheduling of the uplink control and transmit data received from the user on carrier C1 with the uplink scheduling of the uplink control information received from the user on carriers C2 and C3 based on the synchronization information received from the secondary cell L2 schedulers 2022-2 and 2022-3. For example, the anchor cell L2 scheduler 2022-1 synchronizes timing information, resource allocation, resource capacity, etc. for the uplink control and transmit data received from the user on carrier C1 with that for the uplink control information received from the user on carriers C2 and C3. The synchronization performed by the anchor cell L2 scheduler 2022-1 may be performed in any well-known manner, and will not be described in detail herein.

At step S1110, the anchor cell L2 scheduler 2022-1 outputs the synchronized uplink scheduling information for the uplink control and transmit data received from the user on carrier C1 to the queue buffer 5020-1 for output to the RNC 210 and further processing and transmission of data on the uplink.

As with the example embodiment shown in FIG. 4, in the example embodiment shown in FIG. 5 one or more of the anchor cell L2 scheduler 2022-1, the secondary cell L2 scheduler 2022-2 and the secondary cell L2 scheduler 2022-3 also monitors downlink channel quality by receiving and analyzing CQI and Ack/Nack signaling to determine the channel quality and data error for a last downlink transmission. In another example, one or more of the anchor cell L2 scheduler 2022-1, the secondary cell L2 scheduler 2022-2 and the secondary cell L2 scheduler 2022-3 may monitor uplink channel quality in a similar manner. By combining CQI, Ack/Nack, bit error rate and other control information, one or more of the anchor cell L2 scheduler 2022-1, the secondary cell L2 scheduler 2022-2 and the secondary cell L2 scheduler 2022-3 determines next scheduling actions, such as maintaining current state of operation, requesting user retransmission, adjusting channel power, removing the channel, etc.

Example embodiments provide a distributed scheduling implementation for a multi-board architecture (MBA) at a NodeB. The multi-board architecture described herein enables multiple L1/L2 processing boards at a NodeB to be viewed together as a system, thereby distributing RF antenna streams and feature sets among multiple L1/L2 processing boards at the NodeB.

The multi-board architecture according to one or more example embodiments may reduce unnecessary resource consumption at a NodeB by decreasing duplicated functionality present in the conventional single board architecture. In one example, the L1/L2 processing boards process only a portion or fraction of the antenna streams as compared to the conventional single board architecture.

Example embodiments may also extend the life cycle of existing boards and provide for the ability to add additional features to existing boards.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A transceiver station providing wireless resources for cells on a plurality of carriers in a geographical coverage area, the transceiver station comprising:
   a first board including
      an anchor cell L2 scheduler configured to schedule at least one of first uplink or first downlink transmissions for a multi-carrier user on only a first of the plurality of carriers;
      an anchor cell L1 processing circuit configured to at least one of (i) demodulate and decode the scheduled first uplink transmissions or (ii) encode and modulate the scheduled first downlink transmissions; and
      a first transceiver configured to at least one of (i) receive the scheduled first uplink transmissions from the multi-carrier user on the first of the plurality of carriers, or (ii) transmit the scheduled first downlink transmissions to the multi-carrier user on the first of the plurality of carriers; and
   a second board including
      a secondary cell L2 scheduler configured to schedule at least one of second uplink or second downlink transmissions for the multi-carrier user on only a second of the plurality of carriers, the second board being separate from, but interconnected with, the first board;
      a secondary cell L1 processing circuit configured to at least one of (i) demodulate and decode the second uplink transmissions or (ii) encode and modulate the second downlink transmissions; and
      a second transceiver configured to at least one of (i) receive the scheduled second uplink transmissions from the multi-carrier user on the second of the plurality of carriers, or (ii) transmit the scheduled second downlink transmissions to the multi-carrier user on the second of the plurality of carriers; and
   wherein the anchor cell L2 scheduler is further configured to
      sort downlink transmit data for the multi-carrier user based on the carrier on which the downlink transmit data is to be transmitted to the multi-carrier user to generate first downlink transmit data to be transmitted on the first of the plurality of carriers and second downlink transmit data to be transmitted on the second of the plurality of carriers, and
      output the second downlink transmit data to the second board.

2. The transceiver station of claim 1, wherein:
   the anchor cell L2 scheduler is further configured to generate first downlink scheduling information for transmitting the first downlink transmit data to the multi-carrier user on only the first of the plurality of carriers based on synchronization information from the secondary cell L2 scheduler; and
   the secondary cell L2 scheduler is further configured to generate second downlink scheduling information for transmitting the second downlink transmit data to the multi-carrier user on only the second of the plurality of carriers based on the second downlink transmit data output from the anchor cell L2 scheduler.

3. The transceiver station of claim 2, wherein the anchor cell L1 processing circuit is further configured to,
   generate at least one radio frequency antenna stream based on the first downlink scheduling information and the first downlink transmit data, and
   output the generated at least one radio frequency antenna stream to the first transceiver for transmission to the multi-carrier user on only the first of the plurality of carriers, the first transceiver including at least one radio frequency antenna.

4. The transceiver station of claim 2, wherein the secondary cell L1 processing circuit is further configured to,
generate at least one radio frequency antenna stream based on the second downlink scheduling information and the second downlink transmit data, and
   output the generated at least one radio frequency antenna stream to the second transceiver for transmission to the multi-carrier user on only the second of the plurality of carriers, the second transceiver including at least one radio frequency antenna.

5. The transceiver station of claim 1, wherein the anchor cell L2 scheduler is further configured to, synchronize the first and second downlink transmit data for scheduling transmissions to the multi-carrier user on the first and second of the plurality of carriers based on synchronization information from the secondary cell L2 scheduler.

6. The transceiver station of claim 1, wherein the anchor cell L1 processing circuit is further configured to,
  obtain first uplink control and transmit data transmitted by the multi-carrier user on only the first of the plurality of carriers, and
  output the obtained first uplink control and transmit data to the anchor cell L2 scheduler; and
  wherein the anchor cell L2 scheduler is further configured to,
    generate first uplink scheduling information based on the obtained first uplink control and transmit data output from the anchor cell L1 processing circuit,
    synchronize the first uplink scheduling information with second uplink scheduling information from the secondary cell L2 scheduler, and
    output the synchronized first and second uplink scheduling information to a radio network controller via a queue buffer.

7. The transceiver station of claim 6, wherein the secondary cell L1 processing circuit is further configured to,
  obtain second uplink control and transmit data transmitted by the multi-carrier user on only the second of the plurality of carriers, and
  output the obtained second uplink control and transmit data to the secondary cell L2 scheduler; and
  wherein the secondary cell L2 scheduler is further configured to,
    generate the second uplink scheduling information based on the second uplink control and transmit data from the second cell L1 processing circuit, and
    output the second uplink scheduling information to the anchor cell L2 scheduler.

8. The transceiver station of claim 1, wherein the anchor cell L2 scheduler is further configured to, generate first downlink scheduling information for transmitting the first downlink transmit data to the multi-carrier user on only the first of the plurality of carriers, and
  synchronize the first downlink scheduling information with second downlink scheduling information for transmitting the second downlink transmit data to the multi-carrier user on only the second of the plurality of carriers based on synchronization information from the secondary cell L2 scheduler.

9. The transceiver station of claim 8, wherein the anchor cell L1 processing circuit is further configured to,
  generate at least one radio frequency antenna stream based on the first downlink scheduling information and the first downlink transmit data, and
  output the generated at least one radio frequency antenna stream to the first transceiver for transmission to the multi-carrier user on only the first of the plurality of carriers, the first transceiver including at least one radio frequency antenna.

10. The transceiver station of claim 8, wherein the secondary cell L2 scheduler is configured to,
  generate the second downlink scheduling information for transmitting the second downlink transmit data to the multi-carrier user on only the second of the plurality of carriers, and
  synchronize the second downlink scheduling information with first downlink scheduling information based on synchronization information from the anchor cell L2 scheduler.

11. The transceiver station of claim 10, wherein the secondary cell L1 processing circuit is further configured to,
  generate at least one radio frequency antenna stream based on the second downlink scheduling information and the second downlink transmit data, and
  output the generated at least one radio frequency antenna stream to the second transceiver for transmission to the multi-carrier user on only the second of the plurality of carriers, the second transceiver including at least one radio frequency antenna.

12. The transceiver station of claim 1, wherein the anchor cell L1 processing circuit is further configured to obtain first uplink control and transmit data transmitted by the multi-carrier user on only the first of the plurality of carriers, and to output the first uplink control and transmit data to the anchor cell L2 scheduler; and
  wherein the anchor cell L2 scheduler is further configured to,
    generate first uplink scheduling information based on the first uplink control and transmit data from the anchor cell L1 processing circuit,
    synchronize the first uplink scheduling information with second uplink scheduling information based on synchronization information from the secondary cell L2 scheduler, and
    output the synchronized first uplink scheduling information to a radio network controller via a first queue buffer.

13. The transceiver station of claim 12, wherein the secondary cell L1 processing circuit is further configured to obtain second uplink control and transmit data transmitted by the multi-carrier user on only the second of the plurality of carriers, and to output the second uplink control and transmit data to the secondary cell L2 scheduler; and
  wherein the secondary cell L2 scheduler is further configured to,
    generate the second uplink scheduling information based on the second uplink control and transmit data from the secondary cell L1 processing circuit,
    synchronize the second uplink scheduling information with the first uplink scheduling information based on synchronization information from the anchor cell L2 scheduler, and
    output the second uplink scheduling information to the radio network controller via a second queue buffer.

14. A method for communicating data at least one of to or from a transceiver station providing wireless resources for cells on a plurality of carriers in a geographical coverage area, the method comprising:
  scheduling, at a first board, at least one of first uplink or first downlink transmissions for a multi-carrier user on only a first of the plurality of carriers;
  at least one of (i) first receiving the scheduled first uplink transmissions from the multi-carrier user on the first of the plurality of carriers, or (ii) first transmitting the scheduled first downlink transmissions to the multi-carrier user on the first of the plurality of carriers, the first receiving including demodulating and decoding the first uplink transmissions, and the first transmitting including encoding and modulating the first downlink transmissions;
  scheduling, at a second board interconnected with the first board, at least one of second uplink or second downlink transmissions for the multi-carrier user on only a second of the plurality of carriers;
  at least one of (i) second receiving the scheduled second uplink transmissions from the multi-carrier user on the second of the plurality of carriers, or (ii) second transmitting the scheduled second downlink transmissions to the multi-carrier user on the second of the plurality of carriers, the second receiving including demodulating and decoding the second uplink transmissions, and the second transmitting including encoding and modulating the second downlink transmissions;

sorting, at the first board, downlink transmit data for the multi-carrier user based on the carrier on which the downlink transmit data is to be transmitted to the multi-carrier user to generate first downlink transmit data to be first transmitted on the first of the plurality of carriers and second downlink transmit data to be second transmitted on the second of the plurality of carriers;

outputting the second downlink transmit data from the first board to the second board; and generating, at the first board, first downlink scheduling information for first transmitting the first downlink transmit data to the multi-carrier user on only the first of the plurality of carriers based on synchronization information from the second board.

15. The method of claim 14, further comprising:

generating, at the second board, second downlink scheduling information for second transmitting the second downlink transmit data to the multi-carrier user on only the second of the plurality of carriers based on the second downlink transmit data.

16. The method of claim 14, further comprising:

obtaining first uplink control and transmit data transmitted by the multi-carrier user on only the first of the plurality of carriers;

generating first uplink scheduling information based on the obtained first uplink control and transmit data;

synchronizing the first uplink scheduling information with second uplink scheduling information from the second board; and outputting the synchronized first and second uplink scheduling information to a radio network controller via a queue buffer.

17. The method of claim 14, further comprising:

generating first downlink scheduling information for first transmitting the first downlink transmit data to the multi-carrier user on only the first of the plurality of carriers; and synchronizing the first downlink scheduling information with second downlink scheduling information for second transmitting the second downlink transmit data to the multi-carrier user on only the second of the plurality of carriers based on the synchronization information from the second board.

18. The method of claim 14, further comprising:

obtaining first uplink control and transmit data transmitted by the multi-carrier user on only the first of the plurality of carriers;

generating first uplink scheduling information based on the obtained first uplink control and transmit data;

synchronizing the first uplink scheduling information with second uplink scheduling information based on the synchronization information from the second board; and outputting the synchronized first uplink scheduling information to a radio network controller via a queue buffer.

* * * * *